United States Patent
Murphy et al.

(10) Patent No.: US 11,531,969 B1
(45) Date of Patent: *Dec. 20, 2022

(54) LOCATION-BASED USER DATASET MANAGEMENT

(71) Applicant: MASSACHUSETTS MUTUAL LIFE INSURANCE COMPANY, Springfield, MA (US)

(72) Inventors: Richard Murphy, Melrose, MA (US); Brian Berard, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/820,501

(22) Filed: Mar. 16, 2020

Related U.S. Application Data

(63) Continuation of application No. 15/359,505, filed on Nov. 22, 2016, now Pat. No. 10,592,868.

(60) Provisional application No. 62/260,418, filed on Nov. 27, 2015.

(51) Int. Cl.
| | |
|---|---|
| *G06Q 10/10* | (2012.01) |
| *H04L 67/52* | (2022.01) |
| *G06Q 40/06* | (2012.01) |
| *H04L 51/222* | (2022.01) |
| *G06F 16/9537* | (2019.01) |
| *H04L 67/01* | (2022.01) |

(52) U.S. Cl.
CPC ......... *G06Q 10/1095* (2013.01); *G06Q 40/06* (2013.01); *H04L 51/222* (2022.05); *H04L 67/52* (2022.05); *G06F 16/9537* (2019.01); *H04L 67/01* (2022.05)

(58) Field of Classification Search
CPC .... G06Q 10/1095; G06Q 40/06; H04L 51/20; H04L 67/18; H04L 67/42; G06F 16/9537
See application file for complete search history.

(56) References Cited

U.S. PATENT DOCUMENTS

| | | | |
|---|---|---|---|
| 9,858,584 B2 * | 1/2018 | Jain | H04L 67/306 |
| 10,305,998 B2 * | 5/2019 | Zhang | H04W 4/02 |
| 10,445,774 B2 * | 10/2019 | Reese | H04W 4/029 |
| 10,592,868 B1 * | 3/2020 | Murphy | H04L 67/18 |
| 10,942,913 B1 * | 3/2021 | Khoyilar | G06F 9/542 |
| 2011/0066470 A1 | 3/2011 | Goyal et al. | |
| 2013/0151301 A1 | 6/2013 | Robb | |
| 2013/0282621 A1 | 10/2013 | Joenk | |
| 2014/0149249 A1 * | 5/2014 | Goad | G06Q 30/0631 705/26.7 |
| 2014/0189802 A1 | 7/2014 | Montgomery | |
| 2014/0343991 A1 * | 11/2014 | Hofstee | G06Q 30/0601 705/7.18 |
| 2016/0342950 A1 | 11/2016 | Pignataro et al. | |

(Continued)

*Primary Examiner* — Dylan C White
(74) *Attorney, Agent, or Firm* — Foley & Lardner LLP

(57) ABSTRACT

The system and methods described herein provide for managing user datasets by facilitating interactions between users and their advisors following location-based notification of certain triggering events in the user dataset. The geolocation of the user is used to identify nearby advisors who can provide consultation as required by the user. Some embodiments facilitate introductions to a potential user of a set of advisors matched to the user's profile and in response to certain triggering events in the user's dataset.

18 Claims, 3 Drawing Sheets

(56) References Cited

U.S. PATENT DOCUMENTS

| | | | |
|---|---|---|---|
| 2017/0147951 A1 | 5/2017 | Meyer et al. | |
| 2018/0032997 A1* | 2/2018 | Gordon | G06Q 30/0269 |
| 2018/0040064 A1 | 2/2018 | Grigg et al. | |
| 2018/0285975 A1* | 10/2018 | Ewanio | G06F 16/337 |
| 2022/0027951 A1* | 1/2022 | Flowers | G06N 20/00 |

* cited by examiner

LOCATION-BASED USER DATASET MANAGEMENT

CROSS REFERENCE TO RELATED APPLICATIONS

This application is a continuation application of U.S. patent application Ser. No. 15/359,505, filed Nov. 22, 2016, which claims priority to U.S. Provisional Patent Application Ser. No. 62/260,418, filed Nov. 27, 2015, each of which is hereby incorporated by reference in its entirety.

FIELD OF DISCLOSURE

The present disclosure relates in general to systems, methods, and apparatuses for managing user datasets.

BACKGROUND

Many clients expect to meet with their advisors and discuss their needs at their convenience. Conventionally, interacting with advisors requires setting up appointments, using traditional methods such as calling or emailing the advisor several days in advance, which may lead to several inconvenient back-and-forth communications regarding availability and suitable locations for the appointment. Many clients are more likely to reach out and discuss their needs, when the clients know that they are in the proximity of an advisor, who is available at that moment or shortly thereafter. Additionally, many clients do not monitor their account activities and may not even be aware of a need to meet with an advisor. Conventional methods fail to address the above-mentioned shortcomings. As the processing power of computers has increased and the Internet technology era allows for more interconnectivity between computing systems and mobile devices, many institutions utilize software solutions to facilitate meetings between clients and advisors. However, since implementation of these software solutions, many technical shortcomings have been identified and have created a new set of challenges. For example, data associated with clients (e.g., location of the client or data associated with a client's account) and data associated with advisors (e.g., location of the advisor or data associated with advisor skills and qualifications) may be stored within different databases. Managing such data on different databases and platforms is difficult due to number, size, or content of the data stored.

SUMMARY

For the aforementioned reasons, there is a need for a computer system and method for processing data related to a client, anticipating a need for a meeting with an advisor, and facilitating a meeting between the client and an advisor in a more efficient manner than possible with human-intervention or conventional software solutions. Disclosed herein are systems and methods addressing the shortcomings of the art, which may provide any number of additional or alternative advantages.

In an embodiment, a method comprises receiving, by a server form a client computing device, a triggering threshold value corresponding to a value associated with a client dataset, wherein the client dataset is associated with a plurality of client records associated with a client and stored in a client database. The method comprises monitoring, by the server, the value associated with the client dataset. The method comprises in response to the value associated with the client dataset satisfying the triggering threshold value, generating by the server, a first instruction configured to activate a geolocation module and query geolocation data. The method comprises upon transmitting the first instruction to an electronic client device, receiving by the server, geolocation data associated with the electronic client device. The method comprises generating, by the server, a second instruction to receive data associated with an electronic advisor device within a geographical proximity to the electronic client device. The method comprises upon transmitting the second instruction to a resource database, receiving by the server, data associated with the electronic advisor device within the geographical proximity to the electronic client device. The method comprises generating, by the server, a third instruction to receive a calendar dataset status, associated with the electronic advisor device, wherein the calendar dataset status corresponds to a time availability associated with the electronic advisor device. The method comprises upon transmitting the third instruction to a third database, receiving by the server, the time availability associated with the electronic advisor device, wherein the third database is associated with the electronic advisor device. The method comprises in response to the calendar dataset status being associated with available, generating by the server, a notification comprising data associated with the electronic advisor device, and the calendar dataset status. The method further comprises transmitting, by the server, the notification to the electronic client device.

Another embodiment comprises a computer system comprising a client database hosted by one or more servers comprising non-transitory machine-readable memory, the client database configured to store a plurality of client records attributable to one or more clients. The computer system comprises a server configured to receive form a client computing device, a triggering threshold value corresponding to a value associated with a client dataset, wherein the client dataset is associated with a plurality of client records associated with a client and stored in a client database. The server is configured to monitor the value associated with the client dataset. The server is configured to generate a first instruction configured to activate a geolocation module and query geolocation data, in response to the value associated with the client dataset satisfying the triggering threshold value. The server is configured to upon transmitting the first instruction to an electronic client device, receive geolocation data associated with the electronic client device. The server is configured to generate a second instruction to receive data associated with an electronic advisor device within a geographical proximity to the electronic client device. The server is configured to upon transmitting the second instruction to a resource database, receive data associated with the electronic advisor device within the geographical proximity to the electronic client device. The server is configured to generate a third instruction to receive a calendar dataset status, associated with the electronic advisor device, wherein the calendar dataset status corresponds to a time availability associated with the electronic advisor device. The server is configured to upon transmitting the third instruction to a third database, receive the time availability associated with the electronic advisor device, wherein the third database is associated with the electronic advisor device. The server is configured to in response to the calendar dataset status satisfying a threshold, generate a notification comprising data associated with the electronic advisor device, and the calendar dataset status. The server is configured to transmit the notification to the electronic client device.

In yet another embodiment, a computer implemented method comprises transmitting, by a server, a triggering threshold value to an application programming interface associated with a potential client dataset associated with a first plurality of potential client records, wherein the triggering threshold value corresponds to a first value associated with a potential client dataset. The method comprises generating, by the server, a first instruction to continuously monitor the first value associated with the potential client dataset. The method comprises upon transmitting the first instruction to the application programming interface, receiving by the server, a first notification corresponding to the first value associated with the potential client dataset satisfying the triggering threshold value. The method comprises generating by the server, a second instruction configured to activate a geolocation module and query geolocation data associated with an electronic device associated with the potential client. The method comprises upon transmitting the second instruction to the application programming interface, receiving by the server, geolocation data associated with the electronic device associated with the potential client. The method comprises generating, a third instruction configured to receive a first plurality of electronic advisor devices within a geographical proximity to the electronic device associated with the potential client. The method comprises upon transmitting the third instruction to a resource database associated with the first plurality of electronic advisor devices, receiving the first plurality of electronic advisor devices. The method comprises receiving, by the server, a second plurality of potential client records comprising one or more categories of data associated with at least one of demographics of potential clients, membership in organizations, internet viewing and search history, and purchase history. The method comprises assigning, by the server, a second value to each category of data within the second plurality of potential client records. The method comprises receiving, by the server, a first plurality of advisor records comprising one or more categories of data associated with at least one of demographics of advisors, membership in organizations, internet viewing and search history, and purchase history. The method comprises assigning, by the server, a third value to each category of data within the first plurality of advisor records. The method comprises determining, by the server, an electronic advisor device within the first plurality of advisor records, wherein the third value associated with the advisor associated with the electronic advisor device satisfies a threshold. The method comprises receiving, by the server, a calendar dataset status associate with the electronic advisor device. The method comprises in response to the calendar dataset status being associated with available, generating by the server, a notification comprising data associated with the electronic advisor device and the calendar dataset status. The method further comprises transmitting, by the server, the notification to the electronic device associated with the potential client.

Numerous other aspects, features and benefits of the present disclosure may be made apparent from the following detailed description taken together with the drawing figures. The systems can include less components, more components, or different components depending on desired analysis goals. It should be further understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
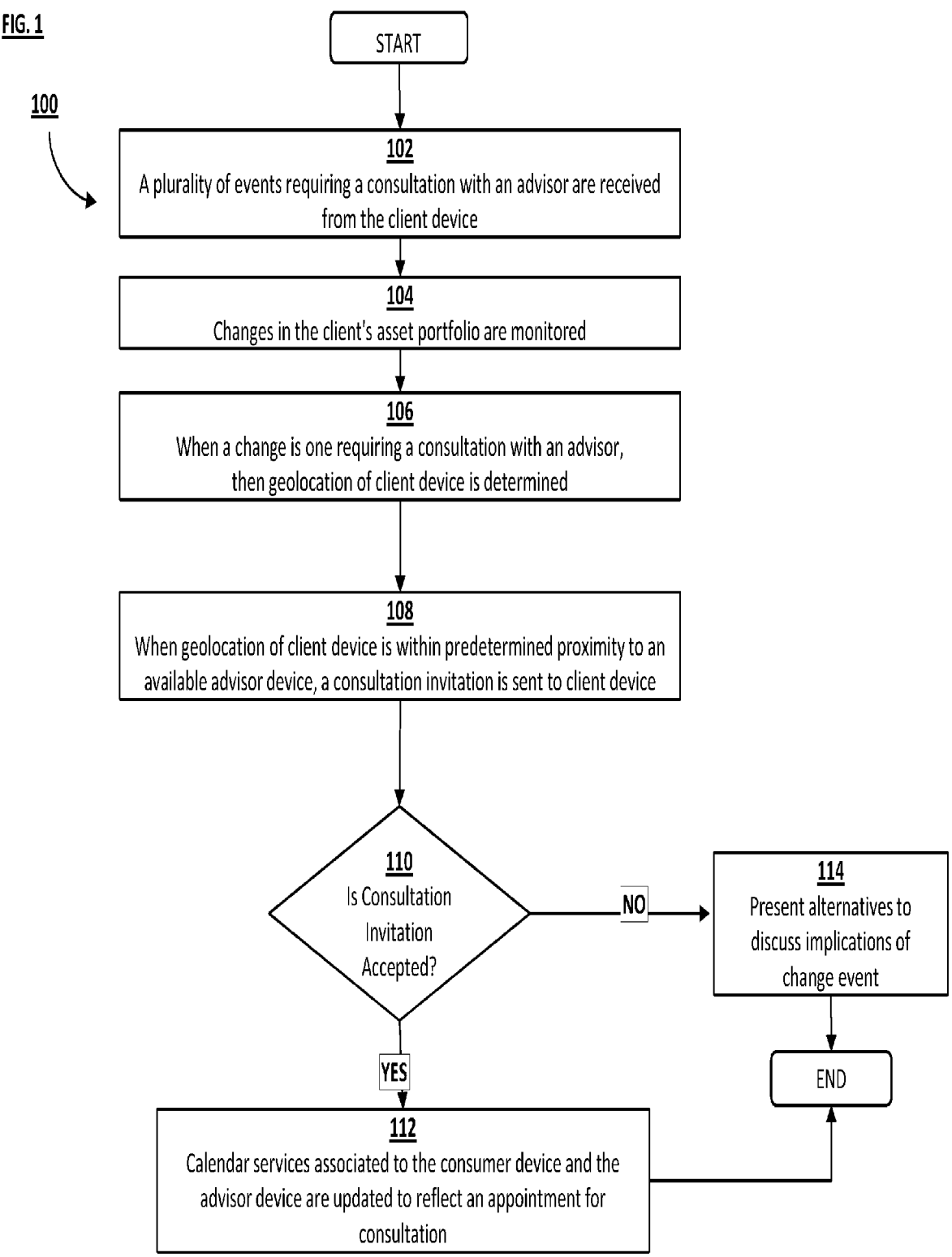
FIG. 1 is flowchart of a method for linking advisors and clients in the context of managing user datasets, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

As used here, the following terms may have the following definitions:

"Advisor" refers to an individual working for or on behalf of a company offering portfolio dataset management products and services, and having knowledge and experience in advising clients regarding portfolio datasets. An agent may represent an intermediary entity or individual between the company and existing and potential client of the dataset management products and services. An "advisor device" can be any type of electronic computing device capable of being connected to the dataset management system, including the analytical engine. In certain embodiments, the advisor devices are capable of being geolocated in any number of ways, such as GPS or identified proximate WiFi hotspot locations. The advisor device may be a smart phone, a tablet, or any computing device having a network connection. The application program used by the advisor to access the dataset management system can include one requiring proper credentials, and browser-based or app-based user interfaces that present, collect, and communicate information between the advisor and the company offering the portfolio dataset management products and services. Upon verifying credentials, the analytical engine may access other applications or services present on the advisor device, such as calendar databases, e-mail services, and computing applications, or combinations thereof.

"Analytical engine" refers to a server or software module that handles data integration, executes rules, and performs data matching by using fuzzy logic, and can include alert and notification, communication management, and administration functionalities, among others.

A "client device" can be any type of electronic mobile computing device capable of executing the application programs and capable of being geolocated in any number of ways, such as GPS, Assisted GPS, or WiFi based positioning, or cell triangulation methods. The client device may be a smart phone, a tablet, or any mobile computing device having a network connection. The application program used by the client to access the dataset management system can include one requiring proper credentials, and graphical user interfaces that present, collect, and communicate information between the client and the company offering the portfolio dataset management products and services. Proper credentials, such as client identifiers or portfolio dataset identifiers, uniquely identify the particular computing device, the user of a computing device, the user of the application program on a computing device, or combinations thereof. The credentials can include alphanumeric strings (either case-sensitive or not), symbols, such as punctuations and mathematical symbols, images, and all combinations thereof. In certain embodiments, this application program on the client device permits that client to interact with the dataset management system across platforms, browsers, and between server and client side applications.

Certain embodiments of the invention include software for a company offering portfolio dataset management products and services. This software allows for specific notifications to a client device when there are events affecting the user datasets of the client. For example, an update or significant change, including infusions of assets, increases or decreases of value, or withdrawals of assets, to the user dataset of the client may lead to the client desiring advice from their advisor or a subject matter expert. These events are stored as a plurality of records associated with the client in a client database that is part of the dataset management system and is accessible to an analytical engine that processes the data within it. Not all change events in the client's portfolio dataset will be trigger events. The list of trigger events can be customizable by the client, dynamically supplemented by the user dataset system to include market events, or any combination thereof. An embodiment of the analytical engine described here detects this change in the client's portfolio dataset, and initiates a secure connection with the client device using a secured server or other authentication servers storing client credentials and/or client account information. In certain embodiments, the dataset management system is configured to periodically inspect the client database and data from other external sources to determine change events when selected data records in the client database have changed from a previous inspection. Once the secure connection is established, the analytical engine then retrieves the geolocation of the client device, which can be performed via a geolocation API or a geolocation module executed on the client device and configured to obtain geolocation data. When a value satisfies a threshold value, the server can instruct the client device to activate the geolocation API or geolocation module to obtain the geolocation data. The client device location can also be obtained through the use of location information servers, which are accessible to application programmable interface modules. Common sources of geolocation data for the analytical engine or the geolocation APIs or modules are IP address, Wi-Fi address, Bluetooth, MAC address, radio-frequency identification (RFID), Wi-Fi connection location, device Global Positioning System (GPS), or GSM/CDMA cell IDs. The list of advisors and related information is stored in the resource database, and this database can be queried to return search area defined as geographical proximity. Geographical proximity can be determined by applying user-defined rules regarding acceptable distance between the client device and the advisor device to compare the geolocation data associated with the client device and a plurality of records containing location of the plurality of advisor devices in the resource database. Proximity can be restricted by preset latitude and longitude boundaries based on the client device's location data. Proximity can also be determined at least in part based on a preset search radius around the geographic coordinates of the client device as the center of the search area.

The analytical engine then searches the database for a list of advisors in the geographical proximity to the client device using the geolocation data, and sends a notification to the advisor devices. Instead of sending a notification to the advisor device, the program can also connect to the calendar databases associated with the advisor device and receive information regarding availability of a particular advisor. For example, a calendar dataset may have a status as available for a certain time period. After determining the availability of the advisor, the analytical engine can subsequently send a notification to the client device. The plurality of records associated with the client in a client database can also include the client's preferences regarding the time of day, day of week, or other conditions for receipt of notification on the client device. Any client-defined preferences for the contents of the notification are also stored as part of the records in the client database. This notification can include one or more of a consultation invitation, an updated report regarding the portfolio dataset, economic models of the impact of the change event in the portfolio dataset, or a message regarding options available for the client if he chooses to take action in response to the change, including setting up a virtual meeting with a subject matter expert. In an embodiment, the consultation invitation can include a calendar invitation for an in-person meeting with the advisor, or a phone call, or a text message to initiate a dialogue with the client. The consultation invitation can include the change event's description, topics for consideration, objectives, date, time, location, participants, priority, relative importance, resources required for said event, or any combination thereof. The notification can also include suggested activities associated with the client records, including one or more of reallocation of assets, and implementation of new investment strategy. In response to the change events in his portfolio dataset, the client may want to redirect his investments among different asset categories, such as stocks, bonds, real property, and cash. The client may also want to discuss any uncertainties associated with the change events. The notification can also include suggestions for implementing new investment strategies that may help deal with the change events, may redirect the growth of the portfolio dataset, and align better with the client's needs following the change events.

FIG. 1 is a flowchart showing an exemplary process 100 for linking advisors electronic systems and client electronic devices in the context of managing client portfolio datasets, according to an exemplary embodiment. In a first step 102, the analytical engine may receive a client input. The client, operating the client device, may input or select a list of events whose occurrence would require a consultation with an advisor. These events are stored as a plurality of records associated with the client in a client database accessible to the analytical engine. The list of trigger events can be customizable by the client, dynamically supplemented by the user dataset system to include market events, or any combination thereof. For example, without limitations, a client can identify certain temporal events as the triggering such as his birthday, or a periodic date to visit portfolio allocation. In some embodiments, the client may be operating a user interface displayed on the client device and can identify certain rule-defined events to trigger notification (e.g., a triggering threshold value) such as when the value of portfolio dataset drops below a certain value (e.g., balance of an account associated with the client is lower than a threshold), or when a market event causes decrease in the value of the portfolio dataset by a specified amount or percentage of the value of the portfolio dataset, or when there is an increase within the value of the portfolio dataset, such as client contribution and the like. The analytical engine may receive such events from the client device. In a next step 104, the analytical engine executed by one or more server computers, monitors the portfolio dataset (e.g., monitor the value associated with the portfolio dataset) for changes and identifies events matching the list of change events predetermined by the client as triggering events. Once a triggering event is detected, the analytical engine initiates a secure connection with the client device and receives the geolocation data of the client device, as in step 106. A person skilled in the relevant art will appreciate that in some embodiment, the analytical engine may generate and transmit an instruction to activate a geolocation data module within the client device (e.g., a geolocation API or a geolocation module executed on the client device and configured to obtain geolocation data such as a GPS device associated with the client device) in order to receive the geolocation data. Based on the geolocation data of the client device, the analytical engine queries a resource database (e.g., generate a query instruction and transmits the instruction to the resource database, where the instruction is configured to query geolocation data) to determine one or more advisors in the geographical proximity to the client device, and sends a notification (e.g., an instruction to display a notification) to the advisor devices. The analytical engine can also connect to a calendar database associated with the advisor device (not shown) and receive information regarding availability of a particular advisor for a consultation with the client. After determining the availability of the advisor, the analytical engine, as in step 108, can subsequently send a notification, such as a consultation invitation, to the client device. In an embodiment, the consultation invitation can include a calendar invitation for an in-person meeting with the advisor. Consultation invitations can also be a phone call, a text message, or a message regarding options available for the client in response to the change, such as setting up a virtual meeting with the advisor or a reviewing materials from a subject matter expert regarding certain assets in the portfolio dataset. In a next step 110, the client device receives the consultation invitation from the analytical engine, and the client can input his acceptance or refusal of the consultation invitation or modification of any component of the consultations, such as a different time, location, or mode of communication. In a next step 112, once the acceptance of the consultation invitation is transmitted to the analytical engine, calendar databases associated to the client device and the advisor device are updated (e.g., the analytical engine generates and transmits an instruction to update the calendars) to reflect an appointment for consultation. In some embodiments, the analytical engine may generate an instruction configured to update the calendar databases associated with the client or the advisor or both. In an alternate step 114, once the refusal of the consultation invitation is transmitted to the analytical engine from the client device, alternatives are presented (e.g., transmitted to the client device) to discuss implications of the change event, such as setting up a virtual meeting with the advisor or a reviewing materials from a subject matter expert regarding certain assets in the portfolio dataset.

A client may interact with the dataset management system through a mobile device executing a mobile application associated with the dataset management system. In some embodiments, the backend server of the mobile application receives real time data regarding the client's portfolio dataset or products, which the backend server monitors using application programmable interface (APIs) configured to communicate data between various third-party systems. Examples of such APIs may include Plaid® or Yodlee® that can supply client-associated data through authorized access to the dataset management system. The client-associated data can be stored in the client database; the analytical engine can also retrieve or be provided real-time data about credit, debit, checking, savings, investments, loan, and more accounts in a clean, usable format. For example, the analytical engine may transmit an instruction to the database or the API to receive such information. The clients may also be amenable to receiving notifications depending on which application programs are in use. Therefore, the dataset management system can queue notifications and operate synchronously with applications that deal with dataset management. For example, if the client is reviewing his finances using financial services, such as Mint®, he may be more open to receiving notifications regarding the availability of an available advisor in his geographical proximity. So upon receipt of change events in the client's portfolio dataset, the analytical engine sends a notification, such as an introductory message with a consultation invitation, to the client device that is both within the geographical proximity to the available advisor device and has a financial application running on it.

Figure 2:
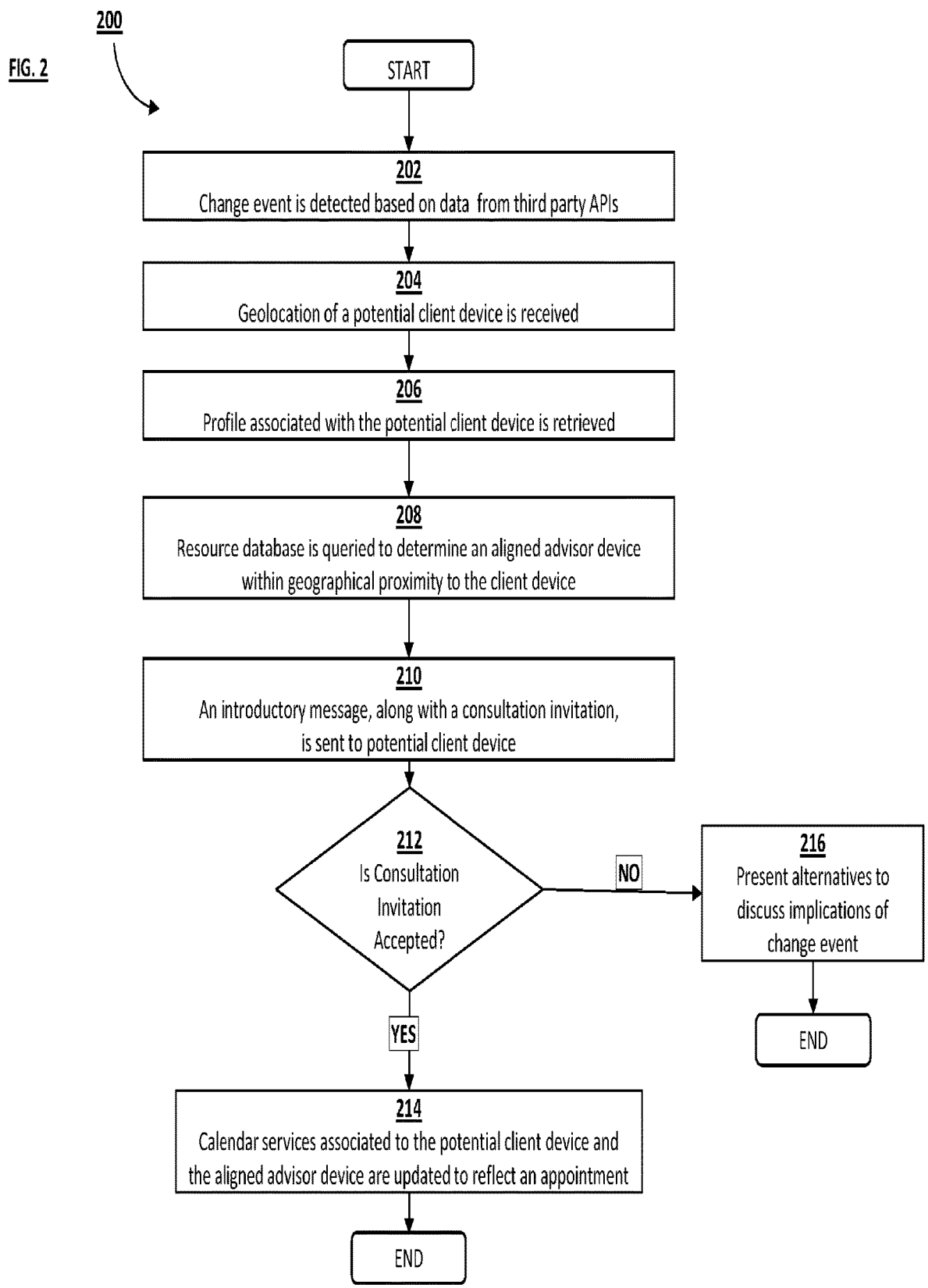
FIG. 2 is a flowchart of a method for linking advisors and potential clients in the context of managing user datasets, according to an exemplary embodiment.

FIG. 2 is a flowchart showing an exemplary process 200 for linking advisors and potential clients in the context of managing user datasets, according to an exemplary embodiment. In a first step 202, the analytical engine receives data from third party APIs regarding the potential client's dataset and analyzes such data to detect change events in the potential client's dataset. For example, the analytical engine may generate and transmit an instruction to the third-party API to continuously monitor a dataset associated with a user. In certain embodiments, the analytical engine receives data after events in the potential client's dataset are aggregated by financial data aggregator services and analyzed to detect change events by software modules, residing external to the dataset management system. In a step 204, the analytical engine receives geolocation of such potential client devices. As explained above, in some embodiment, the analytical engine may generate and transmit an instruction configured to activate a geolocation data module within the client device (e.g., a geolocation API, a geolocation module executed on the potential client device and configured to obtain geolocation data such as a GPS device associated with the potential client device) in order to receive the geolocation data. Based on the geolocation data of the client device, the analytical engine queries (generates an instruction to search) a resource database to determine one or more advisors in the geographical proximity to the potential client device. If the company has advisors in or servicing the area in the geographical proximity of such potential client devices, then in the next step 206, the analytical engine receives profile information associated with each of the potential client devices. The potential client's profile information can include demographic information, user-indicated preferences, internet viewing and search history, purchase history, and app usage data.

In the next step 208, in response to the client's profile information, the analytical engine queries a resource database to determine, from the subset of previously queried advisors, an advisor whose profile aligns with that of the client profile. This alignment of the profiles can include one or more basis, such as both the potential client and advisor attended the same college or follow similar sporting events or are members of the same social organization. In some embodiments, the analytical engine may assign a value for each category of data record for the advisor and compare them to the data records associated with the user. And these criteria for alignment can be weighted based on percentage points or other means. The results from this query can also be ranked (by the analytical engine) based on the number of criteria that aligns or the highest weighted score. One of ordinary skill in the art would understand that different search and match functionalities can be applied to the resource database dependent on the client profile information retrieved from the client device.

Once an aligned advisor or set of aligned advisors is identified by the analytical engine, it sends a notification to the aligned advisor devices. Instead of sending a notification to the aligned advisor device, the analytical engine can also connect to a calendar database associated with the aligned advisor devices and receive information regarding availability of a particular aligned advisor for a consultation with the potential client.

After determining the availability of an aligned advisor, the analytical engine, as in step 210, can send a notification, such as an introductory message with a consultation invitation, to the potential client device. The introductory message contains information regarding the aligned advisor, his services, and details about the products and services offered by the company. In an embodiment, the consultation invitation can include a calendar invitation for an in-person meeting with the advisor. Consultation invitations can also be a phone call, a text message, or a message regarding options available for the client in response to the change, such as setting up a virtual meeting with the advisor or a reviewing materials from a subject matter expert regarding certain assets in the portfolio dataset. In a next step 212, the potential client device receives the consultation invitation from the analytical engine, and the potential client can input his acceptance or refusal of the consultation invitation. In a next step 214, once the acceptance of the consultation invitation is transmitted to the analytical engine, calendar databases associated to the potential client device and the aligned advisor device are updated to reflect an appointment for consultation. In an alternate step 216, once the refusal of the consultation invitation is transmitted to the analytical engine from the potential client device, a notification to stop future notifications or alternatives are presented to discuss implications of the change event, such as setting up a virtual meeting with the advisor or a reviewing materials from a subject matter expert regarding certain assets in the portfolio dataset.

The potential clients may also be amenable to receiving notifications depending on which application programs are in use. So the dataset management system can queue notifications and operate synchronously with apps that deal with asset management. For example, if the potential client is reviewing his finances using financial services, such as Mint®, he may be more open to receiving notifications regarding the availability of a suitable advisor in his geographical proximity. So upon receipt of change events in the client's portfolio dataset, the analytical engine sends a notification, such as an introductory message with a consultation invitation, to potential client device that is both within the geographical proximity to the aligned advisor device and has a financial app running on it.

The potential client can set up rules on his device or third party application programs to receive notifications regarding advisor services and products. In certain embodiments, the APIs providing the data to the analytical engine of the dataset management system can also pool other rule-defined events identified by the potential client for financial apps, such as when the value identifier of his portfolio dataset within his dataset drops below a certain value.

Figure 3:
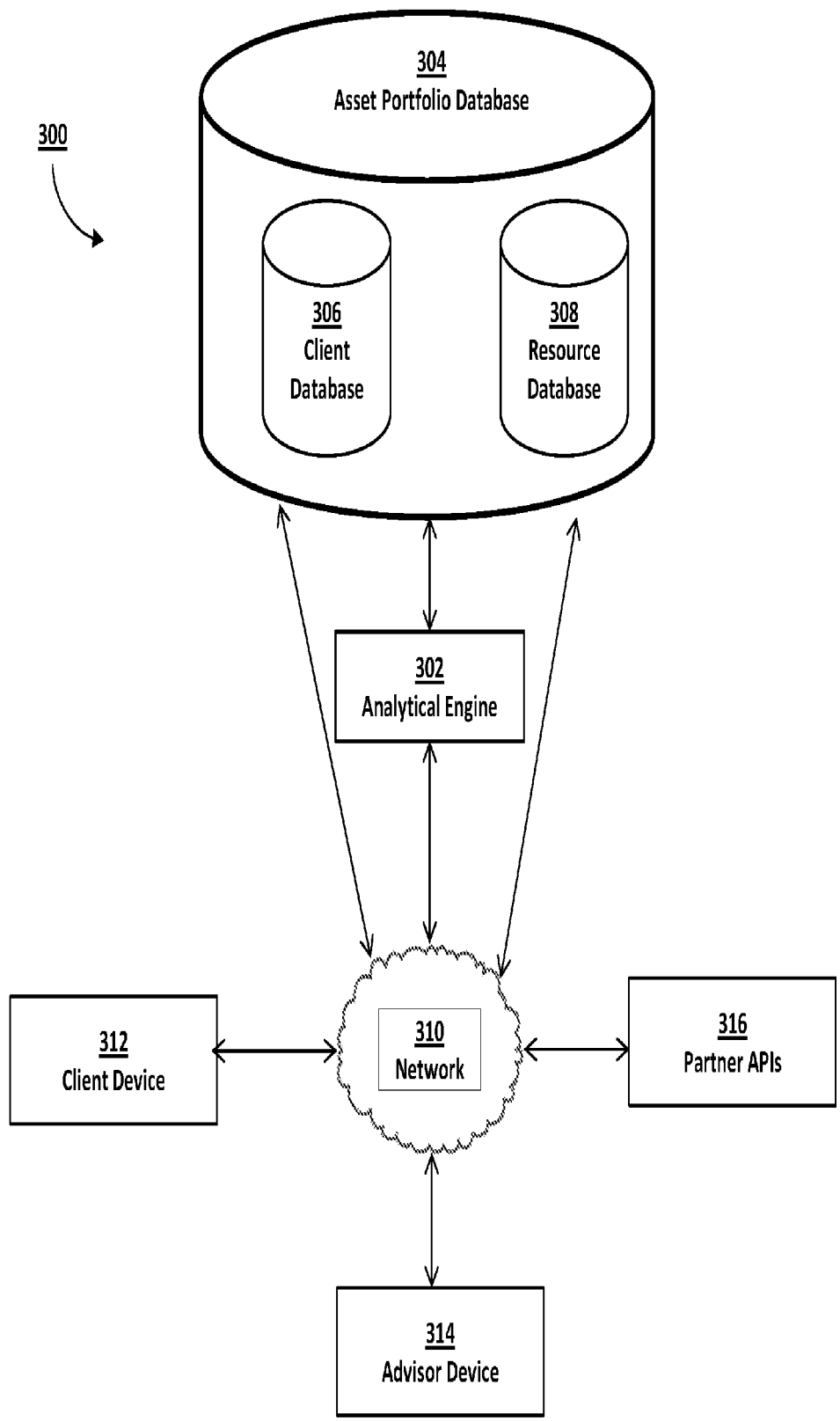
FIG. 3 is a block diagram illustrating a system including an analytical engine within a portfolio management system, according to an exemplary embodiment.

FIG. 3 is a diagram illustrating an dataset management system 300 including an analytical engine, according to an exemplary embodiment. The plurality of steps included in methods 100 and 200 may be performed by one or more computing devices in the system described in 300. Each of the different components of dataset management system 300 may be implemented in any type of computer-based architecture including suitable processor-controlled devices that receive, process, and/or transmit digital data, configured as further described below and in FIG. 3. The dataset management system 300 may include any computing device (e.g., server, personal computer, desktop, laptop) or collection of computing devices (i.e., a distributed-computing environment), comprising processors, software modules, and non-transitory machine-readable storage media, capable of performing the various tasks and processes described herein.

In FIG. 3, analytical engine 302 receives data from an user dataset database 304, which contains client databases 306 and resource database 308 and is communicatively coupled to analytical engine 302. In the embodiment described here, analytical engine 302 receives data from application programs resident on client devices 312 and advisor devices 314, processes the received data, and stores the processed data in the user database 304, or its component databases—client database 306 and resource database 308. In certain aspects, the user database 304, the client database 306, and resource database 308 can be a single entity or nested databases or otherwise interconnected databases.

Devices 312 and 314 are communicatively coupled to and in bi-directional communication with other devices, databases, and components of the dataset management system 300. The analytical engine 302 requests, collects, and presents information from and to one or more of the clients and advisors. In some embodiments, data processing modules of the analytical engine 302 are further configured to automatically retrieve information requested by one or more client devices 312 and advisor devices 314 and/or one or more software modules. The analytical engine 302 can also generate graphical user interfaces on the client device and the advisor device to facilitate interaction with each other and with the dataset management system 300 via a network 310, and to perform associated data acquisition, and processing functionalities. These interfaces can be implemented within an operating system, a discrete GUI software layer, an application program, or any combination thereof. In some embodiments, analytical engine 302 can be executed by a server, one or more server computers, authorized client computing devices, smartphones, desktop computers, laptop computers, tablet computers, PDAs and other types of processor-controlled devices that receive, process, and/or transmit digital data. The analytical engine 302 can be implemented using a single-processor system including one processor, or a multi-processor system including any number of suitable processors that may be employed to provide for parallel and/or sequential execution of one or more portions of the techniques described herein. Analytical engine 302 performs these operations as a result of central processing unit executing software instructions contained within a computer-readable medium, such as within memory. In one embodiment, the software instructions of the system are read into memory associated with the analytical engine 302 from another memory location, such as from storage device, or from another computing device via communication interface. In this embodiment, the software instructions contained within memory instruct the analytical engine 302 to perform processes that are described in FIGS. 1 and 2 above. Alternatively, hardwired circuitry may be used in place of or in combination with software instructions to implement the processes described herein. Thus, implementations described herein are not limited to any specific combinations of hardware circuitry and software.

In certain embodiments, the analytical engine 302 of the dataset management system can activate or interact with external services, applications, and databases through one or more partner application programmable interfaces 316 ("API"), an RSS feed, or some other structured format. The APIs 316 can be any Representational State Transfer Application Programming Interface (REST API) that controls and manages one or more APIs. In these embodiments, API provides web services to one or more mobile applications installed on the computing devices. Examples of web services include showing data on a website, uploading large amounts of data that will later be consumed by a mobile app, downloading data to run custom analytics, exporting data, and the like. APIs are commonly a collection of one or more computing protocols and/or routines that indicate a software program's or software service's functions, and each function's requisite inputs. The APIs may be used to query and fetch data from databases, or pass information to other services or programs. For example, APIs may be used to communicate information and instructions to cloud-based services regarding the assets associated with the client in his portfolio dataset. APIs may be used to facilitate communications between a plurality of servers underlying web-based or network-based services used by the client to monitor, access, or manage assets. Network-based or web-based computing services may provide APIs that allow clients to communicate data or instructions to and from the computing service, using an interface on the client devices.

The client database 306 is a body of information associated with the clients and organized as records. The client database can comprise information from either external sources, internal sources, or both. Information in these databases can be stored or retrieved dynamically using appropriate storage management software. Information stored in a client database 306 includes client name, his demographic information, client-indicated preferences for trigger events and notifications, internet viewing and search history, purchase history, and app usage data, list of preferred advisors, current and past advisor interactions, and current and historical information regarding his assets, including bur not limited to his credit, debit, checking, savings, investments, loan, and more accounts. This information can be used to match the client to a subset of advisors who match the client profile, and can also be used as supplementary information to monitor the client's datasets for trigger events. For example, if the client has children, then their birthdays can be used as triggering events to notify the client about asset allocation for educational purposes. Information stored in the resource database 308 includes advisor name, demographic information, list of clients, geographical areas of service, information regarding skills, knowledge, education, and experience, reviews or complaints, any rating by other clients or business ranking agencies, fee structures, and other relevant information that will assist in matching potential clients.

One or more client-side and server-side technologies or combinations thereof can be implemented to ensure that the graphical user interfaces are dynamically generated based on the updates to the records in the client database. Content for personalized web-based or an app-based interfaces can be dynamically generated on client devices and advisor devices, based on updates to the client database and plurality of inputs from the client devices and advisor devices. Data communicated between the various devices, servers, and other components of the system is encrypted, stored, decrypted, and distributed using one or more firewalls, antivirus and anti-phishing software, file encryption protocols, and other encryption software.

The client device and the advisor device communicate with the dataset management system and with each other through a network 310. Embodiments of a network may vary in the components based on the technology implemented and the relative locations of the client device and the application server hosting the dataset management system. It is to be appreciated that the network may be a public network, such as the Internet, or a private network, which may be logically isolated from the Internet.

Embodiments of the dataset management system may comprise an application server that may functionally operate to execute the various modules of the application. Certain aspects of the mobile application may be executed on the mobile device and certain aspects of the mobile application may be executed by the application server. Nothing described herein should be construed as limiting upon the disclosed subject matter with regards to which device executes aspects of the mobile application. The server may be a plurality of servers operating in concert in a distributed computing system. Not shown in FIG. 3 are various devices that may be used for geolocation technology, such as a satellite for geolocation or a plurality of WiFi hotspots used for determining a device's location. The service provider server may not be one physical device as shown in FIG. 3, but may be a plurality of components working in a distributed computing system to provide users with the service offered by the company.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. Additionally, the operations of a method or algorithm may reside as one or any combination or set of codes and/or instructions on a non-transitory processor-readable medium and/or computer-readable medium, which may be incorporated into a computer program product.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method comprising:
    periodically monitoring, by a server, one or more databases to determine whether an account attribute associated with at least one electronic client device satisfies a predetermined threshold;
    in response to the account attribute of at least one electronic client device satisfying the predetermined threshold, receiving, by the server from a geolocation module of the at least one electronic client device, location data of the at least one electronic client device; and
    in response to identifying that at least one electronic advisor device is physically located within a predetermined range from the at least one electronic client device,
        transmitting, by the server to the at least one electronic advisor device, a notification comprising data associated with the at least one electronic client device and an indication of the account attribute satisfying the predetermined threshold, and
        transmitting, by the server to the at least one electronic client device, an invitation to have a meeting with an advisor operating the at least one electronic advisor device; and
    in response to receiving an acceptance of the invitation from the at least one electronic client device, generating, by the server, a calendar event for calendars of the at least one client device and the at least one electronic advisor device.

2. The method of claim 1, further comprising:
    retrieving, by the server, a calendar status associated with the at least one electronic advisor device, wherein the calendar status corresponds to a time availability associated with the advisor operating the at least one electronic advisor device; and
    transmitting the notification to the at least one electronic advisor device when the advisor has a status corresponding to available.

3. The method of claim 2, further comprising:
    modifying, by the server, the calendar status to unavailable.

4. The method of claim 1, wherein the value corresponds to a balance of an account associated with the at least one electronic client device.

5. The method of claim 1, wherein the notification comprises a plurality of suggested activities.

6. The method of claim 1, wherein the notification further comprises an invitation to initiate a text-based dialogue between the electronic client device and the electronic advisor device.

7. The method of claim 1, further comprising:
    transmitting, by the server to the electronic client device, a notification comprising an identification of an advisor operating the electronic advisor device.

8. The method of claim 1, further comprising, when the server identifies more than one electronic advisor devices within the predetermined range from the at least one electronic client device, assigning a score to each electronic advisor device within the at least one electronic advisor device.

9. The method of claim 8, further comprising transmitting the notification to at least one electronic advisor device based on its respective score.

10. A system comprising:
    at least one electronic client device associated with an account;
    at least one electronic advisor device; and
    a server in communication with the at least one electronic client device and the at least one electronic advisor device, the server configured to:
        periodically monitor one or more databases to determine whether an account attribute associated with at least one electronic client device satisfies a predetermined threshold;
        in response to the account attribute of at least one electronic client device satisfying the predetermined threshold, receive from a geolocation module of the at least one electronic client device, location data of the at least one electronic client device;
        in response to identifying that at least one electronic advisor device is physically located within a predetermined range from the at least one electronic client device,
            transmit, to the at least one electronic advisor device, a notification comprising data associated with the at least one electronic client device and an indication of the account attribute satisfying the predetermined threshold; and
            transmit, to the at least one electronic client device, an invitation to have a meeting with an advisor operating the at least one electronic advisor device; and
        in response to receiving an acceptance of the invitation from the at least one electronic client device, generate a calendar event for calendars of the at least one client device and the at least one electronic advisor device.

11. The system of claim 10, wherein the server is further configured to:
    retrieve a calendar status associated with the at least one electronic advisor device, wherein the calendar status corresponds to a time availability associated with the advisor operating the at least one electronic advisor device, and transmit the notification to the at least one electronic advisor device when the advisor has a status corresponding to available.

12. The system of claim 11, wherein the server is further configured to:
modify the calendar status to unavailable.

13. The system of claim 10, wherein the value corresponds to a balance of an account associated with the at least one electronic client device.

14. The system of claim 10, wherein the notification comprises a plurality of suggested activities.

15. The system of claim 10, wherein the notification further comprises an invitation to initiate a text-based dialogue between the electronic client device and the electronic advisor device.

16. The system of claim 10, wherein the server is further configured to:
transmit, to the electronic client device, a notification comprising an identification of an advisor operating the electronic advisor device.

17. The system of claim 10, wherein when the server identifies more than one electronic advisor devices within the predetermined range from the at least one electronic client device, the server is further configured to assign a score to each electronic advisor device within the at least one electronic advisor device.

18. The system of claim 17, wherein the server is further configured to transmit the notification to at least one electronic advisor device based on its respective score.

* * * * *